R. B. CALCUTT.
TIRE FOR VEHICLES.
APPLICATION FILED JAN. 22, 1907.

914,481.

Patented Mar. 9, 1909.

Witnesses:

Inventor
Reginald B. Calcutt.
Frank D. Thomason
Atty

UNITED STATES PATENT OFFICE.

REGINALD B. CALCUTT, OF AUSTIN, ILLINOIS.

TIRE FOR VEHICLES.

No. 914,481.    Specification of Letters Patent.    Patented March 9, 1909.

Application filed January 22, 1907. Serial No. 353,531.

*To all whom it may concern:*

Be it known that I, REGINALD B. CALCUTT, a citizen of the United States, and resident of Austin, Cook county, Illinois, have invented certain new and useful Improvements in Tires for Vehicles, of which the following is a full, clear, and exact description.

My invention relates to tires for vehicles, and particularly to the tires of light vehicles such as baby-carriages, velocipedes, etc.

Tires made of coiled wire have for a long time past been thought of, but have not, to my knowledge, been put into practical use. This, probably, is, to a greater or less extent, due to the fact that, in order to make the coiled wire endless, its ends are secured together by a coupling device, which, to the extent of its length, made the tire solid and without resiliency, and caused the wheel, as this portion of the tire rolied over the ground to "bump," or, in other words, to be unyielding, as compared to the resiliency of the remainder of the circumference of the tire.

The object of my invention is to overcome this objection entirely, and it consists in dispensing, except as a possible incident, with any coupling or filler in the bore of the coi ed wire tire altogether. This I accomplish by the means hereinafter fully described, and as particularly pointed out in the claims.

Figure 1:
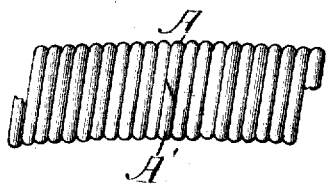
Figure 2:
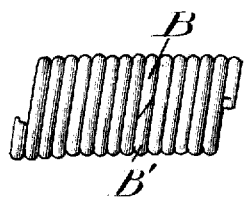
Figure 3:
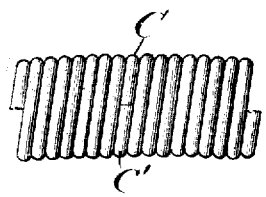
Figure 4:
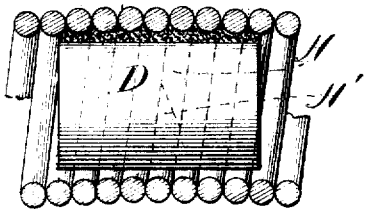

In the drawings: Figure 1 is a side view of a segment of a spirally coiled wire tire embodying my improvements showing the lapping ends of the wire beveled. Fig. 2 is a similar view showing the overlapping ends of the tire provided with reverse or undercut bevels. Fig. 3 is a view similar to Figs. 1 and 2, showing the ends of the wire cut off transversely to make a butt end engagement. Fig. 4 is a longitudinal section of the segment of the tire in which the ends are brought together, disclosing an interior matrix in connection therewith.

My invention consists in welding, either electrically or otherwise, or brazing or soldering the ends of the spirally coiled wire of the tire together. In Fig. 1 the ends, A and A', are beveled, and are brought together and over-lapped, so that, as near as possible, their axes aline, preferably, at the side of the tire, as shown, or at the inner circumference. The point where the ends are brought together is, preferably, located as stated because the ends would be less subject to movement there, and consequently would be less liable to be forced apart or separate than if located within the area of the tread of the tire.

In Fig. 2 of the drawings the ends B and B' of the wire are given an undercut bevel, or bevel the reverse of that shown in Fig. 1, and then overlapped and welded or soldered together, and in Fig. 3 of the drawings the ends C, C' of the wire cut off transversely and butt welded or soldered together. When the ends are welded together the metal of the ends are made homogeneous, but when brazed or soldered, the hard or soft solder is, preferably, made to collect around the joint by forcing apart the coils of wire next the ends with some suitable instrument and applying the solder so as to surround the same. When doing this the solder after it gets on the inside of the tire is hard to control, so I prefer to use, what I call a "matrix" D, consisting of a plug of slightly less diameter than the bore of the tire and of a length just enough to "back" the joint, and insert it in the bore of the ends at the time they are brought together, and then pour in the solder. The matrix causes the solder to spread and completes the joint without causing a solid tire portion, and causing the wheel to bump, because its diameter does not prevent the yielding of the tread and consequent resiliency.

What I claim as new is:

1. A tire for vehicles comprising a spirally coiled wire having a closed bore the ends of which are brought together, a metal matrix of less diameter than said bore inserted in the bores of the ends of said coiled wire, and a layer of fusible metal uniting said matrix to the portion of the coil adjacent to the tread side.

2. A tire for wheels comprising a spirally coiled wire having a closed bore the ends of which are brought together, and a metal matrix of less diameter than said bore which has a portion of its exterior fusible by heat and is inserted in the bores of the ends of said coiled wire and binds the same together.

In testimony whereof I have hereunto set my hand and seal this 14th day of January, A. D., 1907.

REGINALD B. CALCUTT. [L. S.]

Witnesses:
FRANK D. THOMASON,
E. K. LUNDY.